(12) United States Patent
Yu-Tsai

(10) Patent No.: US 6,168,488 B1
(45) Date of Patent: Jan. 2, 2001

(54) LIFE JACKET

(76) Inventor: Chen Yu-Tsai, No. 400 Sec. 2, Chang Shui Rd., Pei Tou, Chang Hua (TW)

( * ) Notice: Under 35 U.S.C. 154(b), the term of this patent shall be extended for 0 days.

(21) Appl. No.: 09/366,756

(22) Filed: Aug. 4, 1999

(51) Int. Cl.$^7$ .................................................... B63C 9/08
(52) U.S. Cl. ........................................... 441/106; 441/116
(58) Field of Search .............................. 441/88, 106, 111, 441/112, 113, 116

(56) References Cited

U.S. PATENT DOCUMENTS

| | | | |
|---|---|---|---|
| 3,449,778 | * | 6/1969 | Jones .......................................... 9/341 |
| 3,545,017 | * | 12/1970 | Cohn .......................................... 9/342 |
| 4,689,030 | * | 8/1987 | McWaters ............................... 441/88 |
| 5,000,710 | * | 3/1991 | Bedortha et al. ..................... 441/129 |
| 5,342,232 | * | 8/1994 | Bardot .................................. 441/115 |
| 5,605,482 | * | 2/1997 | Choy ..................................... 441/106 |

\* cited by examiner

Primary Examiner—S. Joseph Morano
Assistant Examiner—Patrick Craig Muldoon
(74) Attorney, Agent, or Firm—Dougherty & Troxell

(57) ABSTRACT

A life jacket includes a float member and at least a cloth layer adhered on the float member. The float member is made of a floatable material, having a head hole in an intermediate lateral portion, a front float portion, a rear float portion, and a shoulder portion between the front and the rear float portion. The cloth layer is adhered or fused on the front surface and/or the rear surface of the float member to increase the structural strength of the life jacket. The front and the rear float portion have a plurality of band holes for a strap band to pass through to bind them on the body of a user. The rear float portion has plural holes spaced apart to reduce its boyancy. The float member with the head hole, the shoulder portion, the band holes and the holes in the rear float portion are formed by a molding pressing process to reduce the cost of the life jacket.

6 Claims, 4 Drawing Sheets

LIFE JACKET

BACKGROUND OF THE INVENTION

This invention relates to a life jacket, particularly to one easy to make, having enough strength to endure for a long period of time.

Conventional life jackets generally are made of nylon cloth and a plurality of bags contained in the nylon cloth with foam plastic filled in the bags so as to enable the life jackets to float on water.

However, nylon cloth has to be cut and sewn into a coat in making the conventional life jackets, and then the bags are also needed to be sewn through complicated processes. In addition, the foam material has to be cut to suit to the shape and size of the bags, filled in the bags and then sealed. Therefore, conventional life jackets need much labor and time in manufacture, resulting in high cost to hamper them from being popularly used.

SUMMARY OF THE INVENTION

The main objective of the invention is to offer a life jacket that is possible to be made easily, saving time, labor and cost, but having an excellent strength.

The second objective of the invention is to offer a life jacket provided with an increased flexibility and strength of a float member covered with a cloth layer.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
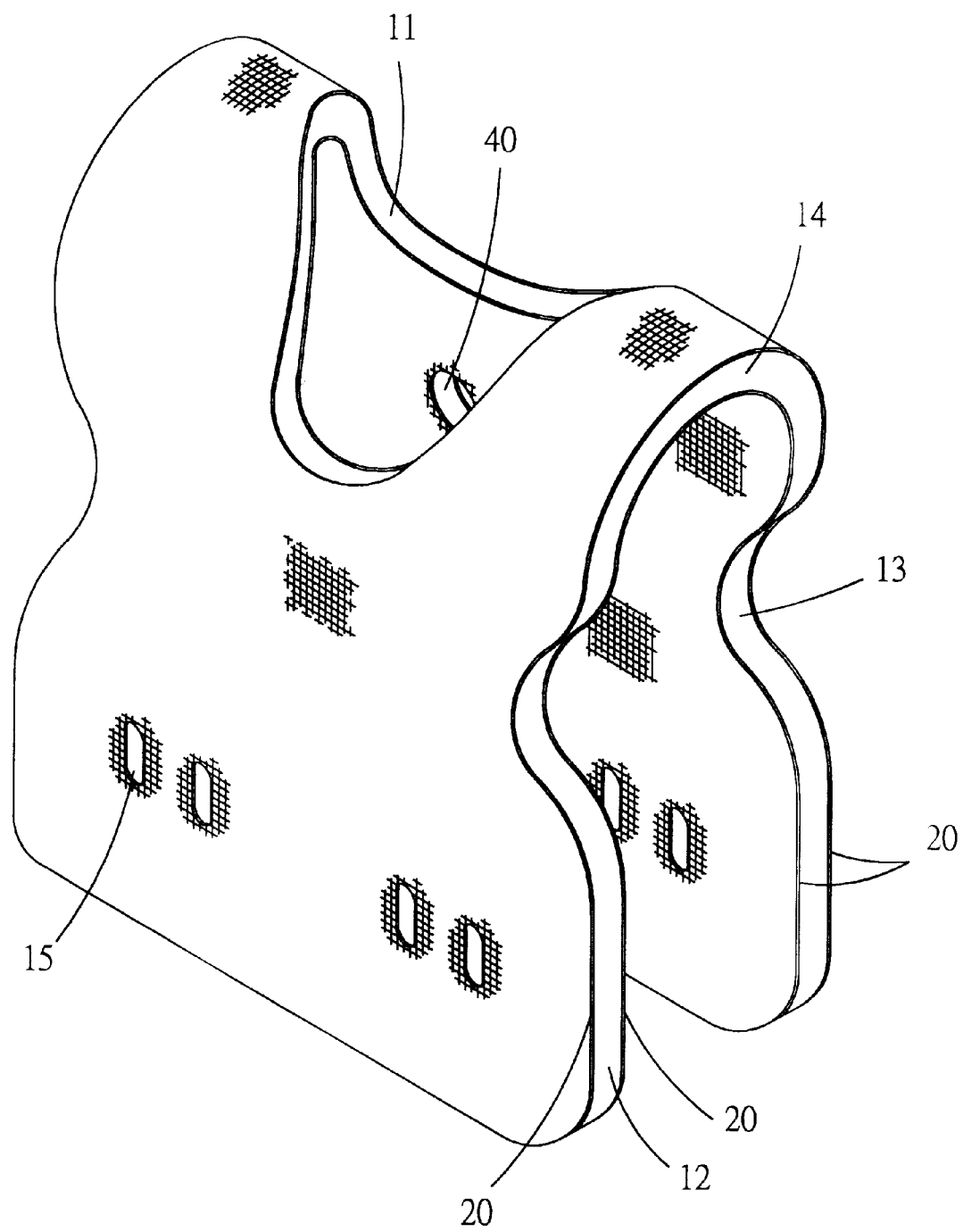
FIG. 1 is a perspective view of a life jacket in the present invention.
Figure 2:
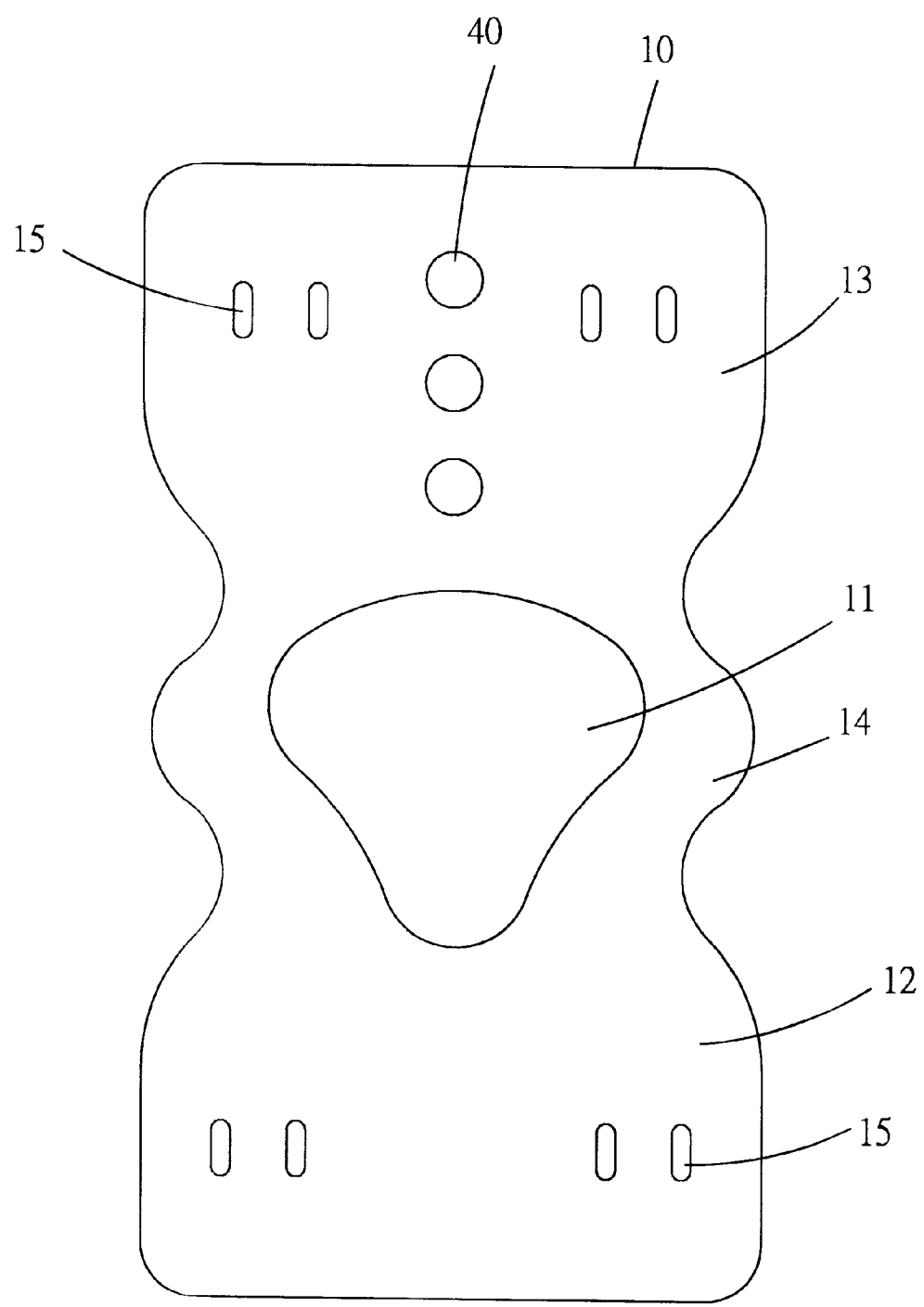
FIG. 2 is an upper view of the life jacket spread out in the present invention.
Figure 3:
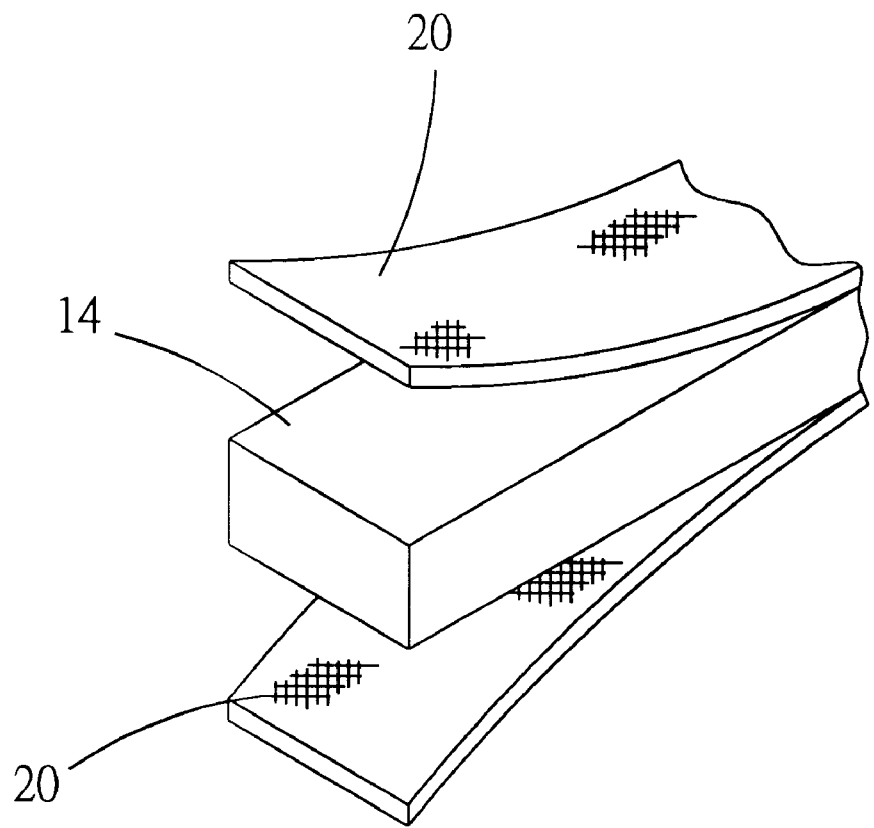
FIG. 3 is a cross-sectional view of a shoulder portion of the life jacket in the present invention; and, FIG. 4 is a perspective view of the life jacket of the invention worn on the body of a user.
Figure 4:
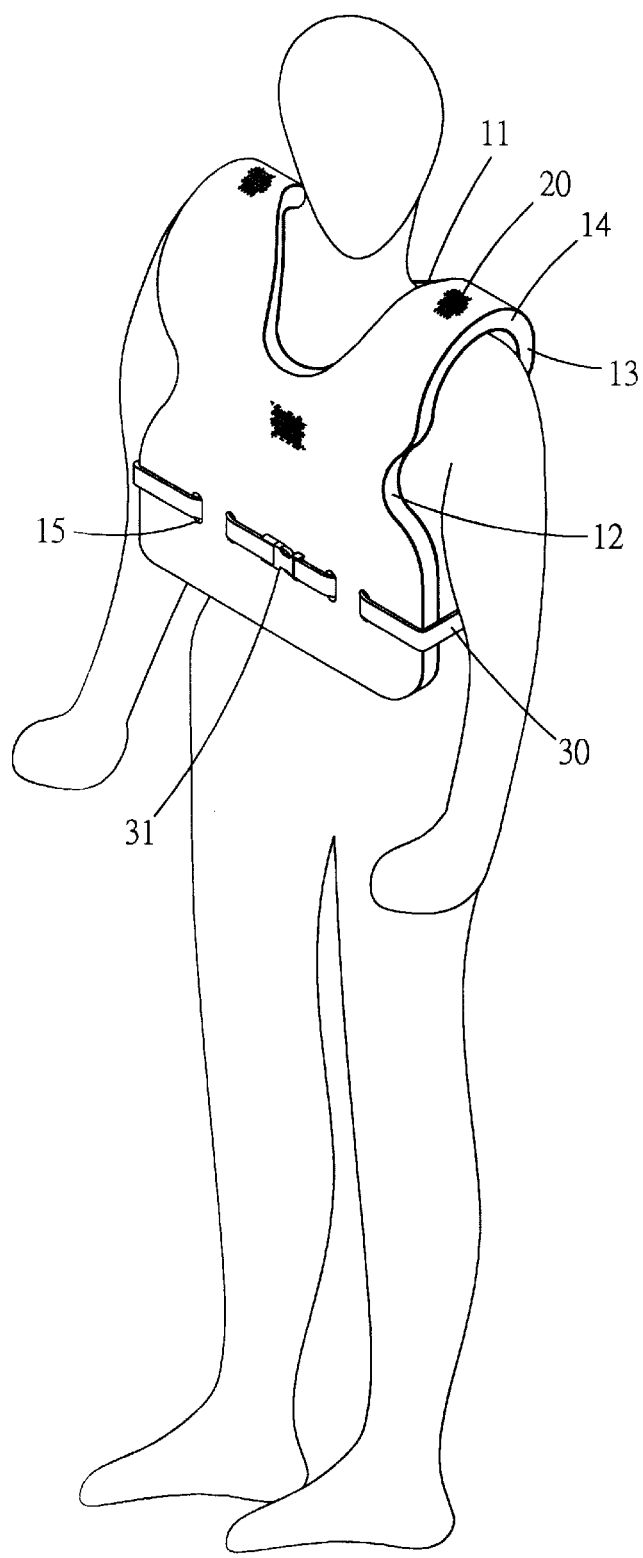

A preferred embodiment of a life jacket in the present invention, as shown in FIGS. 1, 2 and 3, includes a float member 10 and a cloth layer 20 attached on the float member 10.

The float member 10 is made of a floatable material such as foam plastic used in this embodiment, and shaped as a flat flexible board, having a head hole 11 in an intermediate lateral portion, a front float portion 12, a rear float portion 13, and a shoulder portion 14 between the front and the rear float portion 12 and 13. The float member 10 is formed integral by means of molding pressing process, having enough flexibility to permit the shoulder portion 14 to bend to two sides so that the front float portion 12 and the rear float portion 13 may respectively bend down to the front side and the rear side of a user, almost parallel on the breast and the back of the user.

Further, the front float member 12 and the rear float member are respectively provided with a plurality of band holes 15 spaced apart in a line near an outer side, for a strap band 30 to pass through and bind the two float members 12, 13 on the body of a user with a retainer 31.

Further, the rear float member 13 is provided with two holes 40 spaced apart vertically, as shown in FIG. 2, in order to reduce the buoyancy of the rear float member 13. Then the buoyancy of the front float member 12 is larger than that of the rear float member 13 so that the head of a user may easily bend rearward to let the user's face face upward, advantageous for saving user's life.

The two cloth layers 20 are made of nylon or the like, respectively covered on an outer surface and the rear surface of the front and the rear float member 12 and 13 by means of adhesive or fusing by pressured heating process. Preferably the float member 10 is completely covered by the two cloth layers 20.

As to manufacturing process of the life jacket in the invention, firstly the two cloth layers 20 are adhered with or fused with the float member 10 by means of adhesive or heat melting process, and then the float member 10 with the two cloth layers 20 is pressed to cut off the head hole 11, the band holes 15, the holes 40, and center recessed side portions of the front and the rear float portion 12 and 13. Thus, manufacturing process of the life jacket of the invention can economize much time and labor, lowering cost to a large extent.

In the structure of the life jacket, the float member 10 made of foam material can be protected by the cloth layers 20 on all the front and the rear surface and side surfaces, and the cloth layers 20 have a large number of lengthwise and lateral yarns crossing one another, forming a strong protecting means to the foam portion of the float member 10, and permitting the shoulder portion 14 to flexibly bend to let the front and the rear float portion 12 and 13 easily bend on the body of a user.

Likewise, the head hole 11 and the band holes 15 are also reinforced in its circumferential strength by the net-like structure of the cloth layers 20, enhanced in its durability.

In addition, the two cloth layers 20 can make up gaps between the life jacket and the body of a user owing to its net-like structure of crossing yarns, and the gaps make up ventilation room for air, letting the user feel comfortable.

The provision of the holes 40 in the rear float member 13 facilitates the head of a user to bend rearward to let the head to face upward, very effective in saving the user's life.

While the preferred embodiment of the invention has been described above, it will be recognized and understood that various modifications may be made therein and the appended claims are intended to cover all such modifications which may fall within the spirit and scope of the invention.

What is claimed is:

1. A life jacket comprising a float member and at least a layer of cloth covering said float member;

said float member made of a floatable material, shaped as a flat board, having a head hole in an intermediate lateral portion for a user's head to pass through, a shoulder portion in said intermediate lateral portion, a front float portion and a rear float portion respectively extending from said shoulder portion;

said cloth layer being adhered or fused on a front surface and a rear surface of said float member in order to increase structural strength of said life jacket; and, at least one hole through said rear float portion to make the buoyancy of the rear portion less than the buoyancy of the front portion.

2. The life jacket as claimed in claim 1, wherein said head hole, said front float portion, said rear float portion and said two shoulder portions of said float member are originally shaped as a flat board and then cut into such a shape by means of a molding pressing process.

3. The life jacket as claimed in claim 1, wherein said cloth layer comprises two cloth layers, fixed on a front surface and a rear surface of said float member.

4. The life jacket as claimed in claim 1, wherein said cloth layer covers all the front, the rear and the side surfaces of said float member.

5. The life jacket as claimed in claim 1, wherein said front float portion and said rear float portion each have a plurality of band holes for a strap band to pass through for binding said front and said rear float portions on the body of a user.

6. The life jacket as claimed in claim 1, wherein said rear float portion has a plurality of holes for reducing buoyancy of said rear float portion.

* * * * *